United States Patent [19]

Tsukada

[11] Patent Number: 5,025,186
[45] Date of Patent: Jun. 18, 1991

[54] ULTRASONIC MOTOR

[75] Inventor: Nobuo Tsukada, Tokyo, Japan

[73] Assignee: Seiko Instruments Inc., Japan

[21] Appl. No.: 539,723

[22] Filed: Jun. 15, 1990

[30] Foreign Application Priority Data

Jun. 26, 1989 [JP] Japan .................. 1-162938

[51] Int. Cl.$^5$ ........................... H01L 41/08
[52] U.S. Cl. ................................. 310/323
[58] Field of Search ............ 310/323, 328, 366

[56] References Cited

U.S. PATENT DOCUMENTS

| 4,580,073 | 4/1986 | Okumura | 310/323 |
| 4,771,203 | 9/1988 | Mukohjima et al. | 310/323 |
| 4,779,019 | 10/1988 | Onishi et al. | 310/323 |
| 4,786,836 | 11/1988 | Tokushima | 310/323 |
| 4,829,209 | 5/1989 | Kawasaki et al. | 310/323 |
| 4,882,500 | 11/1989 | Iijima | 310/323 |
| 4,950,135 | 8/1990 | Tojo et al. | 310/328 X |

FOREIGN PATENT DOCUMENTS

| 0148387 | 8/1985 | Japan | 310/323 |
| 0011073 | 1/1988 | Japan | 310/323 |
| 0031479 | 2/1988 | Japan | 310/323 |
| 0055082 | 3/1989 | Japan | 310/323 |

Primary Examiner—Mark O. Budd
Attorney, Agent, or Firm—Bruce L. Adams; Van C. Wilks

[57] ABSTRACT

An ultrasonic motor adapted to generate a travelling wave by a piezoelectric element and a vibrator to which the piezoelectric element is bonded, the displacement of these parts due to the travelling wave being amplified by a comb-like projection of the vibrator, arranged alternately in the circumferential direction thereof, to frictionally drive a movable member engaged under pressure with the vibrator characterized in that the piezoelectric element is provided on one surface thereof with fan-shaped electrode patterns, the number of which is a multiple of 4, arranged at regular intervals in the circumferential direction thereof, wherein the number of the fan-shaped electrode patterns and that of the vibrator have no common divisor with respect to each other, whereby the scatter of performance of ultrasonic motors, which is caused by a difference in the position in which the piezoelectric element and vibrator are bonded together, is eliminated to enable ultrasonic motors of uniform performance to be obtained.

4 Claims, 4 Drawing Sheets

ULTRASONIC MOTOR

BACKGROUND OF THE INVENTION

This invention relates to the construction of an ultrasonic motor.

A conventional ultrasonic motor consists of a vibrator provided on one surface thereof with a piezoelectric element bonded thereto, and on the other surface thereof with a comb-like projections arranged alternately in the circumferential direction thereof, and a movable member engaged under pressure with the upper surface of the comb-like projections of the vibrator. In such an ultrasonic motor, an electric signal is applied to the piezoelectric element to generate a travelling wave in the vibrator and rotate the movable member by utilizing the lateral amplitude of this wave, and the comb-like projections play a role of extracting a large amplitude without exerting any influence upon the travelling wave in the vibrator.

In such an ultrasonic motor, the efficiency is increased by the comb-like projections provided on the vibrator but it varies due to the positional relation between the comb-like projections and the electrode patterns on the piezoelectric element. Referring to, for example, FIG. 4, a vibrator 1 is provided with a comb-like projections 1a which are hatched. A piezoelectric element 2 is provided on the rear surface thereof with 12 equally shaped electrode patterns 2a-2d spaced regularly in the circumferential direction thereof. The regions of two adjacent electrode patterns 2a, 2b are polarized positively, and those of two adjacent electrode patterns 2c, 2d negatively. Out of the lead wires 5 attached to these electrode patterns 2a-2d, the lead wires attached to the alternate electrode patterns 2a, 2c are bundled 5a, while the lead wires attached to the other alternate electrode patterns 2b, 2d are bundled 5b, signals which have a 90° time phase difference being applied to the lead wires 5a, 5b. Consequently, a travelling wave occurs in the vibrator 1. Although this wave is a travelling wave, it is a combination of the standing waves in the lead wire group 5a and those in the lead wire group 5b. The details of these standing waves are illustrated in FIG. 5, in which the standing waves occurring in the electrode patterns 2a, 2c; 2b, 2d are designated by the letters A and B, respectively. The number of the projections on the vibrator 1 is 24, and the vibrator 1 is bonded to the piezoelectric element 2 so that the center lines of the projections 1e and those of the electrode patterns 2a-2d are aligned. In this case, the peaks C (12 positions) of the standing waves and the center lines of the projections 1e are aligned. Accordingly, the bending rigidity of this vibrator 1 is high, and the flexure thereof is small. On the other hand, in a vibrator bonded to a piezoelectric element so that the center lines of the recesses 1f in the comb-like projections thereof and those of the electrode patterns 2a-2d are aligned as shown in FIGS. 6 and 7, the peaks C (12 positions) of the standing waves are aligned with the center lines of the recesses 1f. Accordingly, the bending rigidity of this vibrator becomes low, so that this vibrator necessarily bends largely. As is clear from the above, a conventional ultrasonic motor has the problem that the efficiency thereof varies greatly due to the scatter of the portions of the vibrator 1 and piezoelectric element 2 at which these two parts are bonded together.

SUMMARY OF THE INVENTION

It is an object of the invention to provide an ultrasonic motor whose efficiency is not influenced by a difference in the bonding portion of the piezoelectric element.

In order to solve the above problem, the present invention is provided on one surface of the piezoelectric element with fan-shaped electrode patterns, the number of which is a multiple of 4, arranged at regular intervals, the number of the electrode patterns and that of the comb-like projections of the vibrator have no common divisor with respect to each other.

In an ultrasonic motor of this invention, the center lines of the comb-like projections of the vibrator and those of the electrode patterns on the piezoelectric element are not aligned over the whole circumferences of the vibrator and piezoelectric element, i.e., the center lines of the electrode patterns and those of the projections deviate from each other gradually in the circumferential direction of the piezoelectric element and vibrator. Therefore, the intensity of the standing wave in one part varies in some cases but the intensity of a synthesized travelling wave is leveled. Accordingly, the scatter of the performance of the parts, which is caused by a difference in the portions of the piezoelectric element and vibrator at which they are bonded together, does not occur.

DETAILED DESCRIPTION OF THE PREFERRED EMBODIMENT

Figure 1:
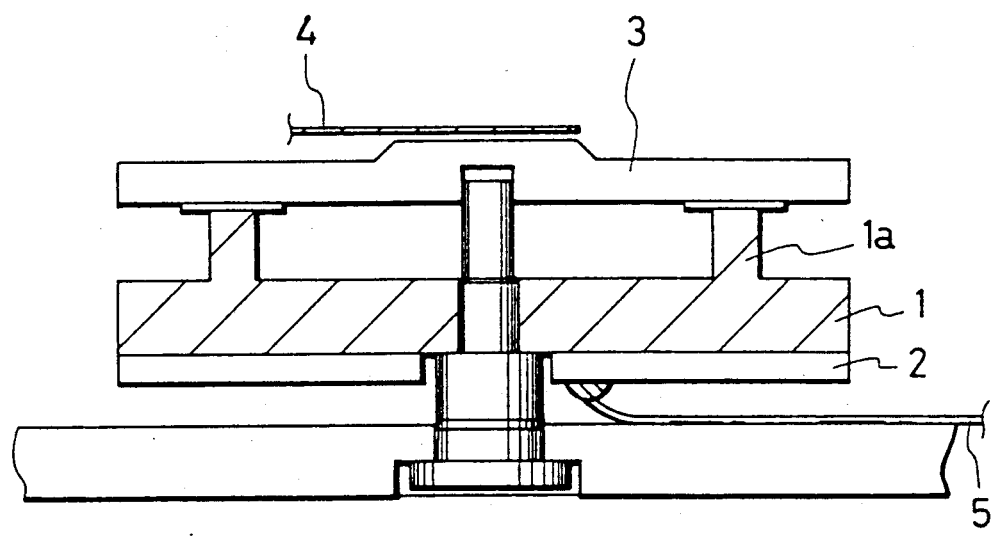
FIG. 1 is a sectional view of the ultrasonic motor according to the present invention.
Figure 2:
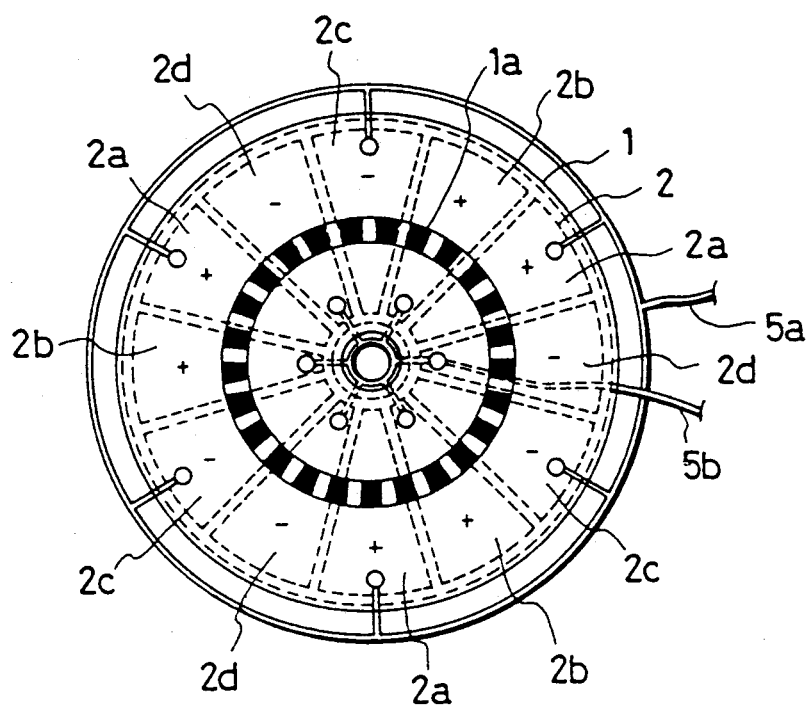
FIG. 2 illustrate the positional relation between the electrodes and the projections on the vibrator in the present invention.
Figure 3:
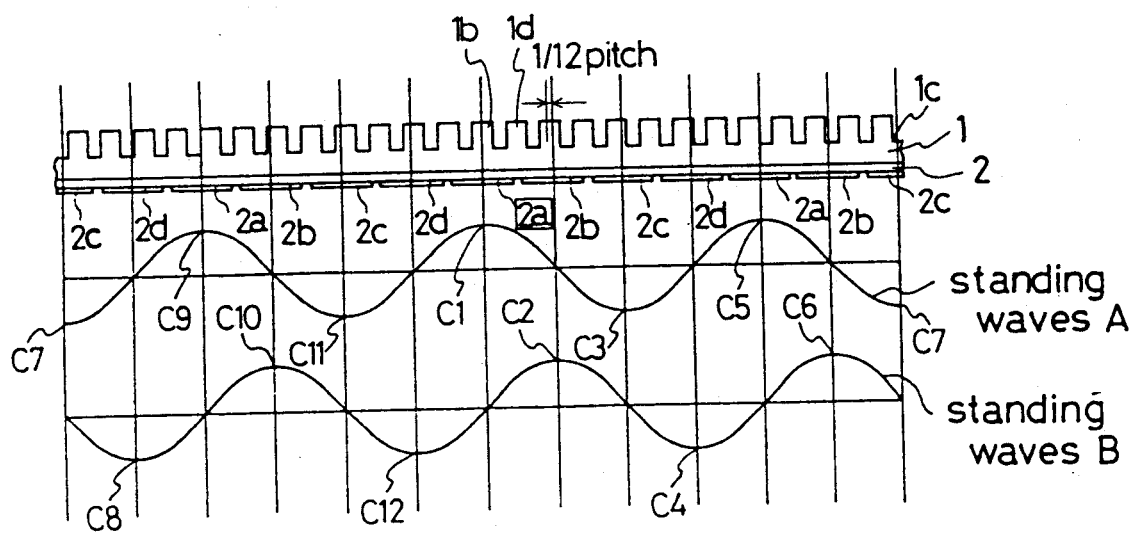
FIG. 3 illustrates the condition of flexure of the standing waves in the present invention.
Figure 4:
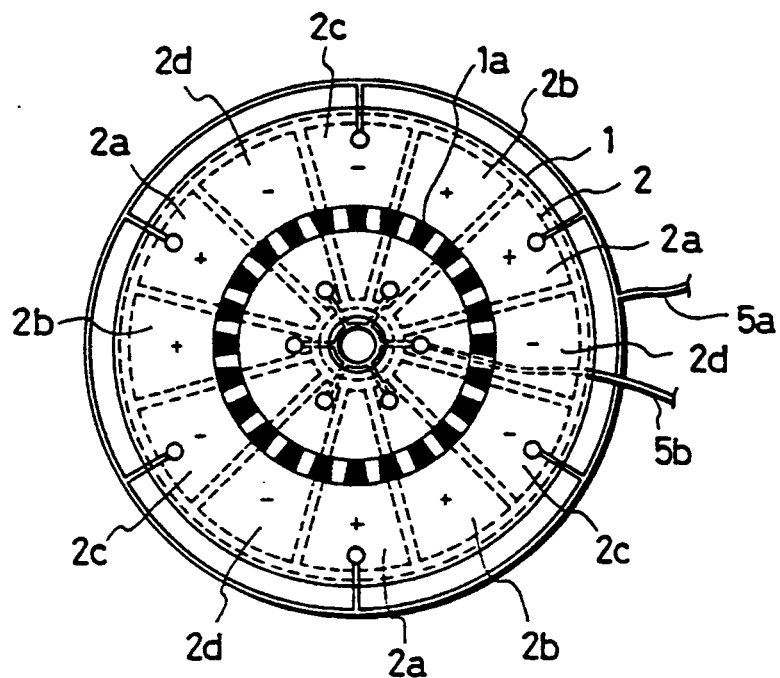
FIG. 4-7 illustrate the prior art variations of the efficiency of an ultrasonic motor, which occur due to a difference in the positional relation between the electrodes and the projections on the vibrator.
Figure 5:
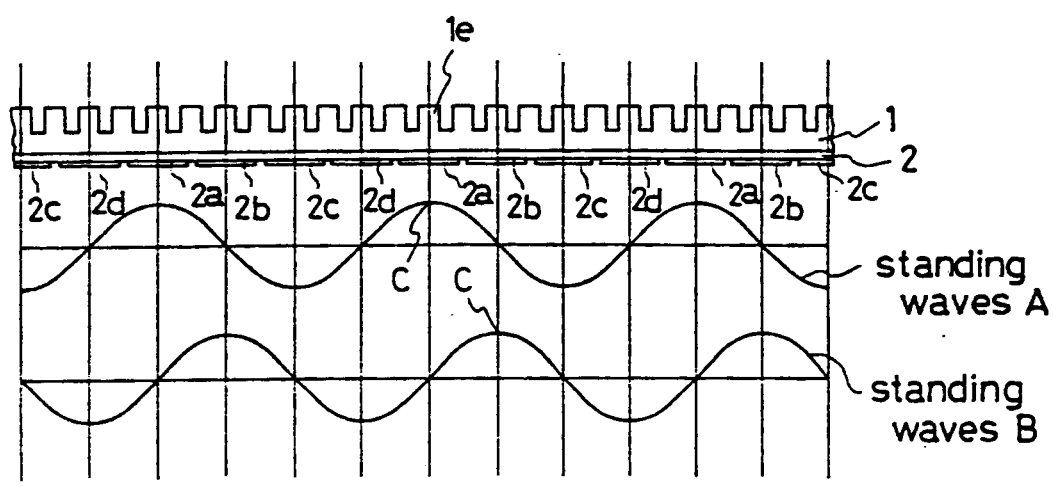
Figure 6:
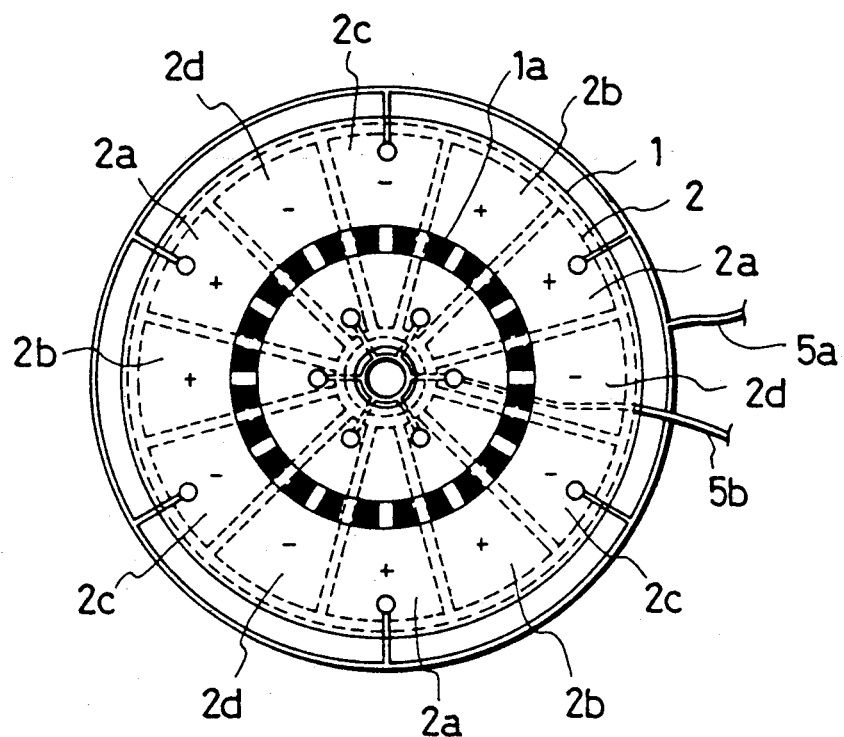
Figure 7:
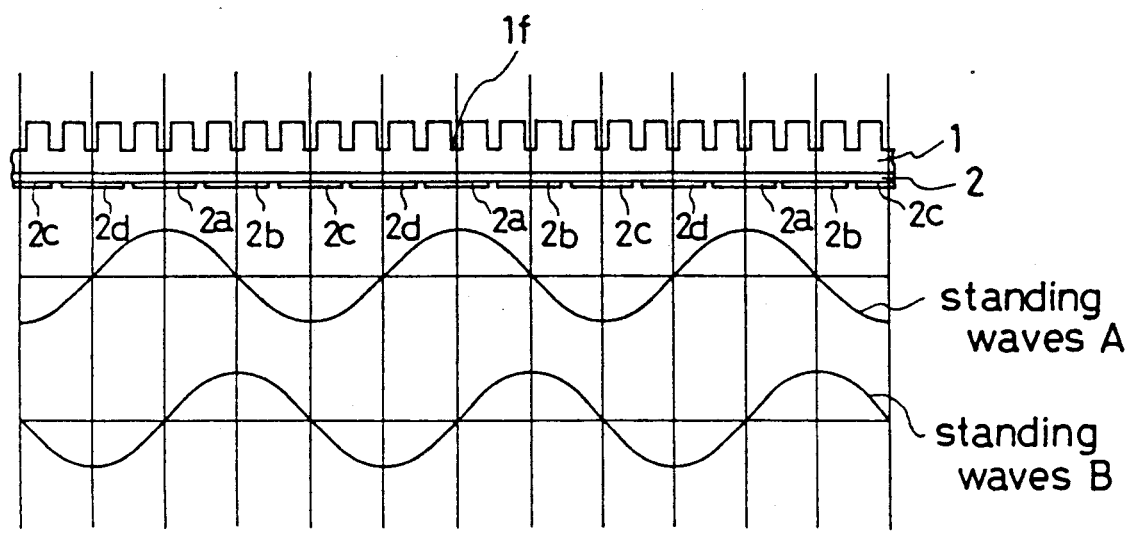

An embodiment of the present invention will now be described with reference to the drawings. FIG. 1 is a sectional view of an ultrasonic motor according to the present invention, in which a vibrator 1 has a piezoelectric element 2 bonded thereto, and a comb-like projections 1a on the other side thereof. A movable member 3 is engaged with the vibrator 1 by the force of a pressure spring 4. The lead wires 5 are soldered to an electrode on the rear surface of the piezoelectric element 2. When an electric current is applied from the lead wires 5 to the piezoelectric element 2, a travelling wave occurs in the vibrator 1, whereby the movable member 3 is rotated. FIG. 2 shows the positional relation between the electrode of the piezoelectric element 2 and the comb-like projections 1a of the vibrator 1. The vibrator 1 is provided with the comb-like projections 1a which are hatched. The piezoelectric element 2 is provided on its rear surface with 12 equally shaped electrode patterns 2a-2d spaced at regular intervals in the circumferential direction thereof. The regions of two adjacent electrode patterns 2a, 2b are positively polarized, and the regions of the other two adjacent electrode patterns 2c, 2d negatively. Out of the lead wires 5 attached to the electrode patterns 2a-2d, the lead wires attached to the alternate electrode patterns 2a, 2c are bundled 5a, while the lead wires attached to the other alternate electrode patterns 2b, 2d are bundled 5b, signals which have a 90° time phase difference being applied to the lead wires 5a, 5b. Consequently, a travelling wave occurs in the vibrator 1. Although this wave is a travelling wave, it is a combination of the standing wave in the lead wire group 5a and those in the lead wire group 5b. The details of these standing waves will now be described with reference to FIG. 3. The standing waves occurring in the electrode patterns 2a, 2c; 2b, 2d are designated by the letters A and B, respectively. The number of the projections on the vibrator 1 is 25. For example, in the case where the vibrator 1 is bonded to the piezoelectric element 2 so that the center line of one electrode pattern (designated by boxed 2a) out of the electrode patterns 2a and that of a projection 1b out of the comb-like projections 1a are aligned, a peak C1 of the standing wave A is aligned with the center line of the projection 1b but a peak C2 of the standing wave B deviates from the center line of a corresponding projection by 1/12 pitch, a peak C3 deviating from the center line of a corresponding projection by 2/12 pitch, a peak C4 deviating from the center line of a corresponding projection by 3/12 pitch, a peak C7 being aligned with the center line of a recess 1c, a peak C8 deviating from the center line of a corresponding projection by 1/12 pitch. Thus, the bending rigidity of the vibrator at the peaks of the standing waves varies little by little in the circumferential direction thereof. When the portions of the piezoelectric element 2 and vibrator 1 at which they are bonded together are shifted a little, the positional relation mentioned above changes a little but, when such portions of these parts are shifted by 1/12 pitch, a projection 1d and the peak C2 are aligned, so that the condition of the standing waves returns to that shown in FIG. 2. Even when the bonding portion of a piezoelectric element is thus varied arbitrarily, a deviation of a projection from a peak of a standing wave occurs every time only a 1/12 pitch deviation of the bonding portion of the piezoelectric element occurs. Moreover, this is caused by the scatter of the intensity of the standing waves. Since the intensity of a travelling wave consisting of a compound of all the standing waves is leveled, the characteristics of the ultrasonic motor do not substantially vary. In the embodiment, the number of the projections of the comb-like projections is set to 25 with respect to that of the electrode patterns. Even when different numbers of projections and electrode patterns are employed, completely the same effect can be obtained as long as the numbers have no common divisor with respect to each other.

According to the present invention described above, a piezoelectric element is provided with fan-shaped electrode patterns, the number of which is a multiple of 4, spaced from one another at regular intervals in the circumferential direction thereof. Since the number of the electrode patterns and that of the comb-like projections of a vibrator have no common divisor with respect to each other, the efficiency of the ultrasonic motor is not influenced by a difference in the bonding portion of the piezoelectric element, and an ultrasonic motor having parts of little scatter of quality and a constant performance can be obtained.

What is claimed is:

1. An ultrasonic motor utilizing travelling wave generated in a vibrator for rotating a movable member comprising:
    a vibrator provided on one surface thereof with a piezoelectric element;
    comb-like projections arranged alternately in the circumferential direction thereof on the other surface of said vibrator;
    a movable member provided on said vibrator;
    a pressure-regulator provided on said movable member for generating suitable contact pressure between said movable member and said vibrator; and
    fan-shaped electrode patterns provided on one surface of said piezoelectric element, the number of which is a multiple of 4, arranged at regular intervals in the circumferential direction thereof, wherein the number of said fan-shaped electrode patterns and that of said comb-like projections of said vibrator have no common divisor with respect to each other.

2. An ultrasonic motor as claimed in claim 1 wherein said number of said fan-shaped electrode is 12.

3. An ultrasonic motor as claimed in claim 2 wherein said number of said comb-like projections is 25.

4. An ultrasonic motor as claimed in claim 1 wherein the center line of said one electrode pattern bonded to said piezoelectric element and the center line of said comb-like projections are aligned.

* * * * *